(12) United States Patent
Tang

(10) Patent No.: US 8,838,870 B2
(45) Date of Patent: Sep. 16, 2014

(54) BASEBOARD MANAGEMENT CONTROLLER AND METHOD FOR SHARING SERIAL PORT

(75) Inventor: Chiang-Chung Tang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 644 days.

(21) Appl. No.: 13/172,860

(22) Filed: Jun. 30, 2011

(65) Prior Publication Data

US 2012/0144180 A1  Jun. 7, 2012

(30) Foreign Application Priority Data

Dec. 2, 2010  (CN) .......................... 2010 1 0574511

(51) Int. Cl.
*G06F 13/42* (2006.01)
*G06F 9/50* (2006.01)

(52) U.S. Cl.
CPC .............. *G06F 9/50* (2013.01); *G06F 13/4282* (2013.01)
USPC ............................... 710/316; 710/310; 713/2

(58) Field of Classification Search
CPC .................................................... G06F 13/4282
USPC ....................... 710/305, 310, 313, 316; 713/2
See application file for complete search history.

(56) References Cited

U.S. PATENT DOCUMENTS

2008/0046706 A1\* 2/2008 Hirai et al. ......................... 713/1
2011/0307639 A1\* 12/2011 Dai ............................... 710/106

\* cited by examiner

*Primary Examiner* — Glenn A Auve
(74) *Attorney, Agent, or Firm* — Novak Druce Connolly Bove + Quigg LLP

(57) ABSTRACT

A baseboard management controller (BMC) connects with a COM serial port. The BMC includes an input queue and an output queue. If a basic input output system (BIOS) of the BMC has been initialized, the COM serial port is used by the BIOS. When a processor of the BMC sends a control command to a sharing system of the BMC, the input queue and the output queue are converted to time division multiplex (TDM) queues. The COM serial port may be used by the BIOS or by the BMC according to an ID flag of each element of the TDM queues.

12 Claims, 3 Drawing Sheets

BASEBOARD MANAGEMENT CONTROLLER AND METHOD FOR SHARING SERIAL PORT

BACKGROUND

1. Technical Field

Embodiments of the present disclosure generally relate to serial ports management, and more particularly to a baseboard management controller and a method for sharing a serial port.

2. Description of Related Art

In a server including a baseboard management controller (BMC), the BMC and a basic input/output system (BIOS) of the server usually use a serial port at one time. A multiplexer (MUX) is needed to switch the serial port to be used either by the BIOS or by the BMC. Either the BIOS or the BMC can use the serial port on condition that the serial port is not used by the other.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
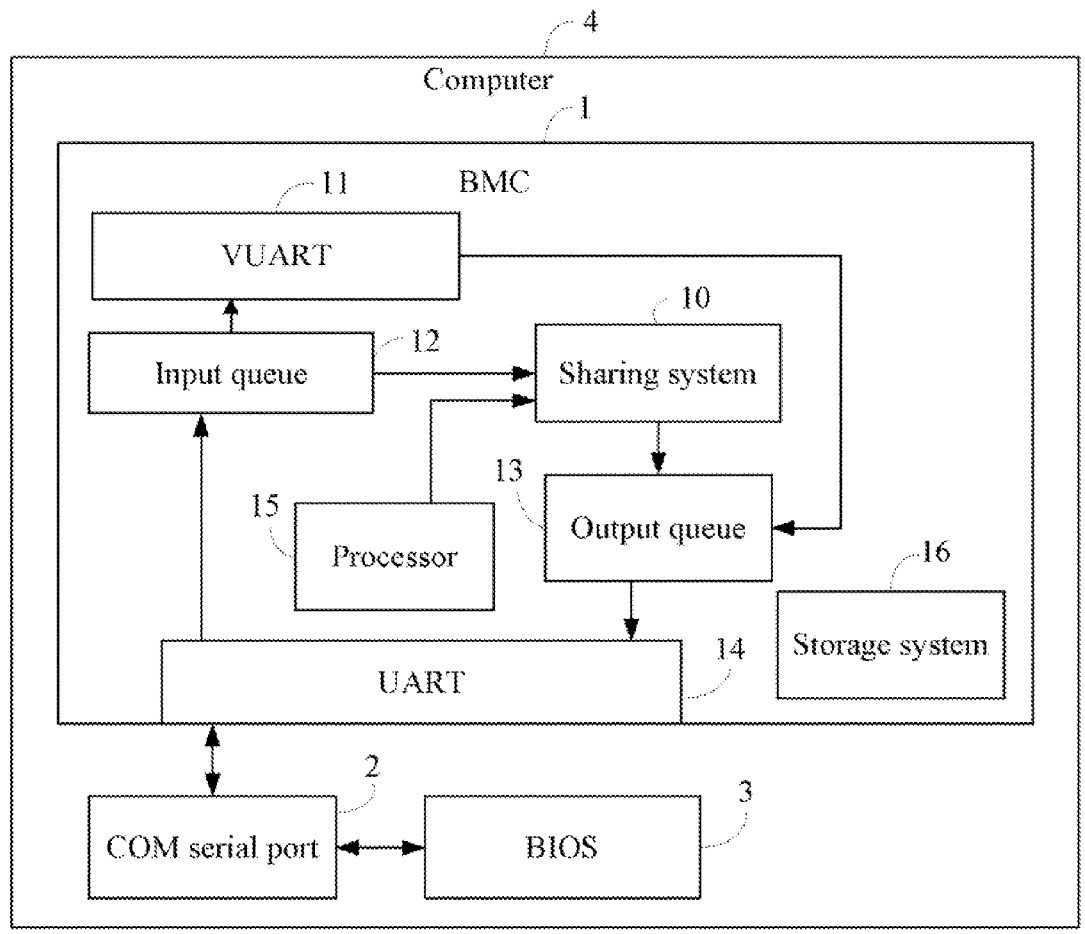
FIG. 1 is a block diagram of one embodiment of a baseboard management controller (BMC) comprising a sharing system.

FIG. 1 is a block diagram of one embodiment of a baseboard management controller (BMC) 1 of a computer 4. The computer 4 includes a COM serial port 2 and a basic input output system (BIOS) 3. The BMC 1 includes a sharing system 10, a virtual universal asynchronous receiver/transmitter (VUART) 11, an input queue 12, an output queue 13, a universal asynchronous receiver/transmitter (UART) 14, and a processor 15.

The VUART 11 connects with the input queue 12 and the output queue 13. The VUART 11 receives data sent from the input queue 12, and sends the received data to the output queue 13.

The BMC 1 connects with the COM serial port 2 via the UART 14. If the BMC 1 uses the COM serial port 2, namely the COM serial port 2 is communicating with the BMC 1, the BMC 1 receives or sends data via the COM serial port 2. For example, if there is data to be input, the UART 14 receives the data via the COM serial port 2 and sends the received data to the input queue 12. The input queue 12 sends the received data to the VUART 11. If there is data to be output, the output queue 13 receives the data from the VUART 11 and sends the received data to the UART 14. The UART 14 outputs the received data via the COM serial port 2.

The sharing system 10 controls the BMC 1 or the BIOS 3 of the computer 4 to use the COM serial port 2. Each element of the input queue 12 and the output queue 13 includes a plurality of parameters. In one embodiment, the parameters may include data packaging, an ID flag, a valid flag, etc. The ID flag denotes which device is using the COM serial port 2. In one embodiment, the COM serial port 2 may be initially assigned to the BIOS 3. In an initial status, a value of the ID flag of each element in the input queue 12 and the output queue 13 may be the BIOS 3. If the BMC 1 starts to use the COM serial port 2, the processor 15 sends a control command to the sharing system 10. The sharing system 10 converts the input queue 12 and the output queue 13 to time division multiplex (TDM) queues according to the control command In one embodiment, if the input queue is converted to the TDM queue, a capacity of the input queue is allocated on a time allocation ratio. The time allocation ratio is set by the control command. For example, if the time allocation ratio is 1:1, the value of the ID flag of one element of the TDM queue is the BIOS 3, and the value of the next element of the TDM queue will be BMC 1.

In an exemplary embodiment, the BMC 1 includes a storage system 16. The sharing system 10 may include one or more modules. The one or more modules may comprise computerized code in the form of one or more programs that are stored in the storage system 16 (or memory). The computerized code includes instructions that are executed by the processor 15 to provide functions for the one or more modules.

Figure 2:
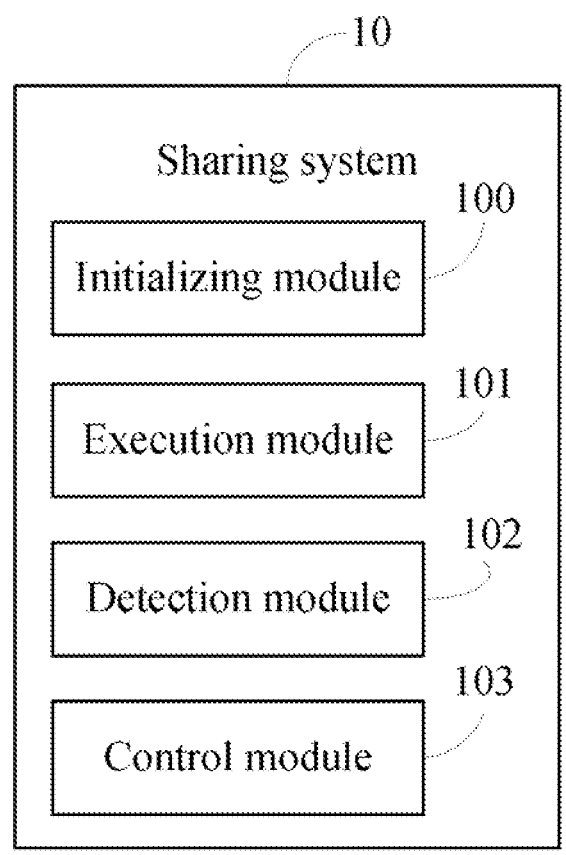
FIG. 2 is a block diagram of one embodiment of the function modules of the sharing system in FIG. 1.

As shown in FIG. 2, the sharing system 10 may include an initializing module 100, an execution module 101, a detection module 102, and a control module 103.

The initializing module 100 initializes the BIOS 3.

The execution module 101 accesses the input queue 12 and the output queue 13 after the initialization of the BIOS 3. When the BIOS 3 has been initialized, the input queue 12 and the output queue 13 are in the initial state. Initially, the COM serial port 2 is used by the BIOS 3.

The detection module 102 detects if the sharing system 10 has received a control command from the processor 15.

If the sharing system 10 has received the control command from the processor 15, the execution module 101 converts the input queue 12 and the output queue 13 into TDM queues according to the control command If the sharing system 10 has not received the control command from the processor 15, the execution module 101 continues to access the input queue 12 and the output queue 13.

The control module 103 controls the BMC 1 or the BIOS 3 to use the COM serial port 2 according to the ID flag of the TDM queues. The control module 103 further controls the BIOS 3 to inform the user that the COM serial port 2 is being used by the BMC 1 or the BIOS 3. In one embodiment, when the COM serial port 2 is used, the BMC 1 may run slowly. The BIOS 3 may inform the user of the cause of the slowness.

Figure 3:
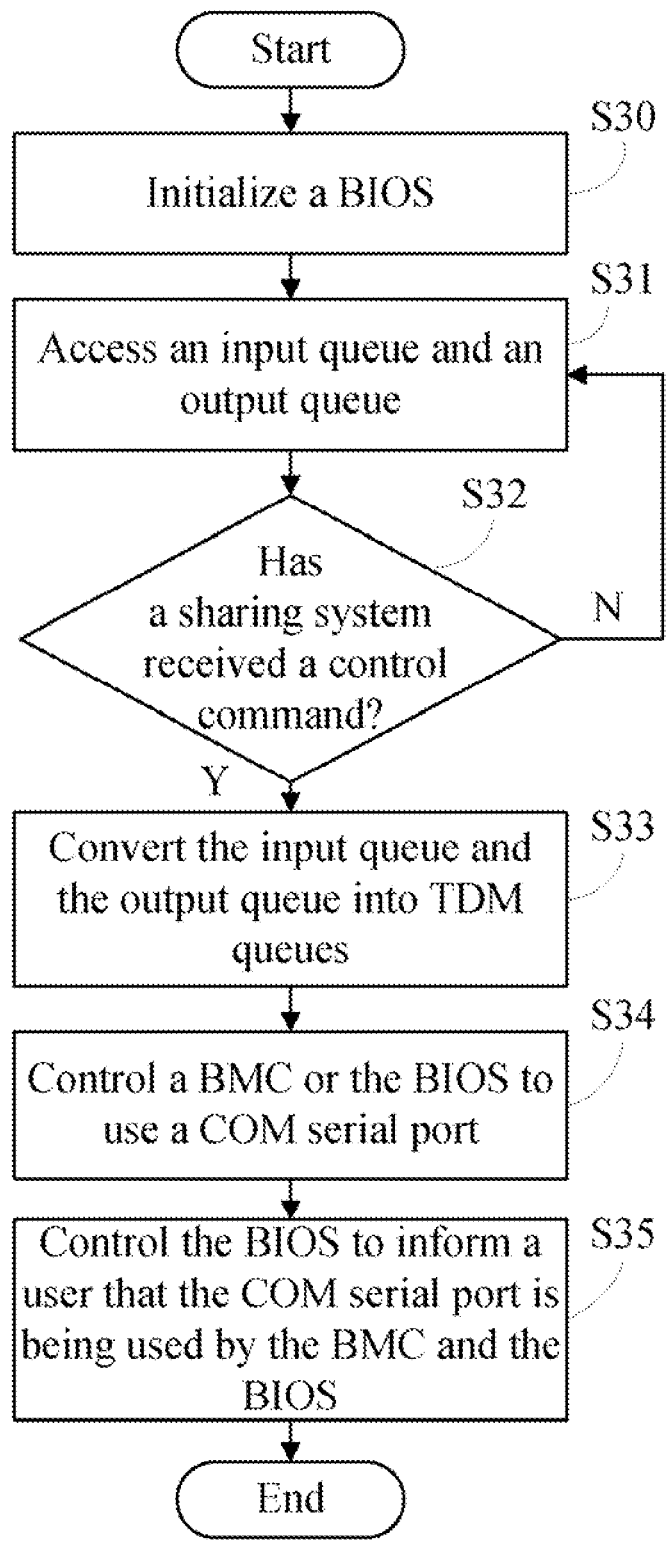
FIG. 3 is a block diagram of one embodiment of a flowchart illustrating a method for sharing a serial port.

FIG. 3 is a flowchart illustrating a method for sharing a serial port. Depending on the embodiment, additional blocks may be added, others removed, and the ordering of the blocks may be changed.

In block S30, the initializing module 100 initializes the BIOS 3.

In block S31, the execution module 101 accesses the input queue 12 and the output queue 13. When the BIOS 3 has been initialized, the input queue 12 and the output queue 13 are in an initial state.

In block S32, the detection module 102 detects if the sharing system 10 has received a control command from the processor 15. If the sharing system 10 has received the control command from the processor 15, block S33 is implemented. If the sharing system 10 has not received the control command from the processor 15, block S31 and then block S32 are repeated.

In block S33, the execution module 101 converts each of the input queue 12 and the output queue 13 to TDM queues according to the control command In block S34, the control module 103 controls the BMC 1 or the BIOS 3 to use the COM serial port 2 according to an ID flag of each element of the TDM queues.

In block S35, the control module 103 controls the BIOS 3 to inform the user that the COM serial port 2 is being used by the BMC 1 or the BIOS 3.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. A baseboard management controller (BMC), comprising:
   a storage system;
   a processor; and
   one or more programs being stored in the storage system and executable by the processor, the one or more programs comprising:
   an initializing module operable to initialize a basic input output (BIOS) of a computer;
   an execution module operable to access an input queue and an output queue which are in an initial state, the input queue and the output queue comprising a plurality of elements, each element comprising an ID flag for that indicates which electronic device is using a COM serial port of the computer;
   the execution module further operable to convert the input queue into a time division multiplex (TDM) queue and also convert the output queue into the TDM queue if the processor sends a control command to a sharing system of the BMC; and
   a control module operable to control the COM serial port to be used by the BIOS or the BMC according to the ID flag of each element of the TDM queues.

2. The BMC as described in claim 1, wherein a value of the ID flag of each element of the input queue and the output queue is the BIOS.

3. The BMC as described in claim 1, wherein the control command comprises a time allocation ratio that determines the values of the ID flag of the TDM queue.

4. The BMC as described in claim 1, wherein the control module is further operable to control the BIOS to inform a user that the COM serial port is being used by the BIOS or the BMC.

5. A method for sharing a serial port, comprising:
   initializing a basic input output (BIOS) of a computer;
   accessing an input queue and an output queue which are in an initial state, the input queue and the output queue comprising a plurality of elements, each element comprising an ID flag for indicating which device is using a COM serial port;
   converting the input queue into a time division multiplex (TDM) queue and converting the output queue into the TDM queue if the processor sends a control command to a sharing system of a baseboard management controller (BMC) of the computer; and
   controlling the COM serial port to be used by the BIOS or the BMC according to the ID flag of each element of the TDM queues.

6. The method as described in claim 5, wherein a value of the ID flag of each element of the input queue and the output queue is the BIOS.

7. The method as described in claim 5, wherein the control command comprises a time allocation ratio that determines the values of the ID flag of the TDM queue.

8. The method as described in claim 5, further comprising:
   controlling the BIOS to inform a user that the COM serial port is being used by the BIOS or the BMC.

9. A non-transitory storage medium having stored thereon instructions that, when executed by a processor, cause the processor to perform a method for sharing a serial port, the method comprising:
   initializing a basic input output (BIOS) of a computer;
   accessing an input queue and an output queue which are in an initial state, the input queue and the output queue comprising a plurality of elements, each element comprising an ID flag for indicating which device is using a COM serial port;
   converting the input queue into a time division multiplex (TDM) queue and converting the output queue into the TDM queue if the processor sends a control command to a sharing system of a baseboard management controller (BMC) of the computer; and
   controlling the COM serial port to be used by the BIOS or the BMC according to the ID flag of each element of the TDM queues.

10. The non-transitory storage medium as described in claim 9, wherein a value of the ID flag of each element of the input queue and the output queue is the BIOS.

11. The non-transitory storage medium as described in claim 9, wherein the control command comprises a time allocation ratio that determines the values of the ID flag of the TDM queue.

12. The non-transitory storage medium as described in claim 9, further comprising:
   controlling the BIOS to inform a user that the COM serial port is being used by the BIOS or the BMC.

* * * * *